United States Patent [19]
Garabedian

[11] Patent Number: 5,668,319
[45] Date of Patent: Sep. 16, 1997

[54] MICROMACHINED ACCELEROMETER

[75] Inventor: Raffi Garabedian, San Leandro, Calif.

[73] Assignee: The Regents of the University of California, Oakland, Calif.

[21] Appl. No.: 621,202

[22] Filed: Mar. 21, 1996

Related U.S. Application Data

[63] Continuation of Ser. No. 193,487, Feb. 7, 1994, abandoned.
[51] Int. Cl.$^6$ ............................................. G01P 15/08
[52] U.S. Cl. .......................... 73/514.09; 73/514.06; 73/654
[58] Field of Search ................... 73/514.09, 514.06, 73/514.07, 654, 754, 715, 716, 717, 718, 719

[56] References Cited

U.S. PATENT DOCUMENTS

| | | | |
|---|---|---|---|
| 3,008,334 | 11/1961 | Lees | 73/514.06 |
| 3,709,041 | 1/1973 | Galowin et al. | 73/515 |
| 3,926,059 | 12/1975 | Fish | 73/514.11 |
| 3,961,536 | 6/1976 | Ringwall | 73/514.11 |
| 3,975,961 | 8/1976 | Hunter et al. | 73/515 |
| 4,002,077 | 1/1977 | Taplin | 73/515 |
| 4,138,893 | 2/1979 | Holmes et al. | 73/516 LM |
| 4,165,503 | 8/1979 | Holmes et al. | 73/514.06 |
| 4,395,908 | 8/1983 | Shopland | 73/516 LM |
| 5,291,784 | 3/1994 | Keyser | 73/516 LM |
| 5,520,054 | 5/1996 | Rome | 73/716 |

*Primary Examiner*—Hezron E. Williams
*Assistant Examiner*—Helen C. Kwok
*Attorney, Agent, or Firm*—John P. O'Banion

[57] ABSTRACT

A fluid proof mass accelerometer fabricated from bonded substrate layers. The device includes a plurality of micromachined fluid cavities which are joined by micromachined fluid channels. The fluid cavities extend from the bonded inner surfaces of the substrate layers to thin resilient membranes which are generally coplanar with the surface. In one embodiment, each substrate layer is thinned toward its outer surface thereby forming integral resilient membranes. In another embodiment, the cavities extend entirely through base substrate layers and thin substrate layers are bonded to the base substrate layers to form a resilient membranes over the cavities. The cavities and channels are sealed and filled with a high density fluid and, when subjected to acceleration, force exerted on the fluid contained within the cavities will cause the cavities to deflect. Signals from pressure sensors positioned on the membranes are algebraically combined to determine translational and rotational acceleration.

13 Claims, 8 Drawing Sheets

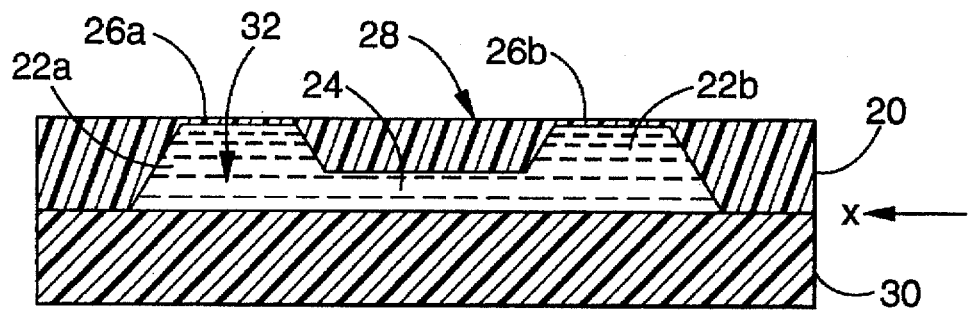
FIG. − 4
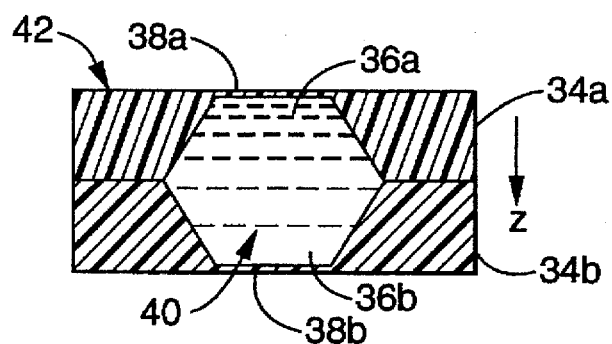
FIG. − 5
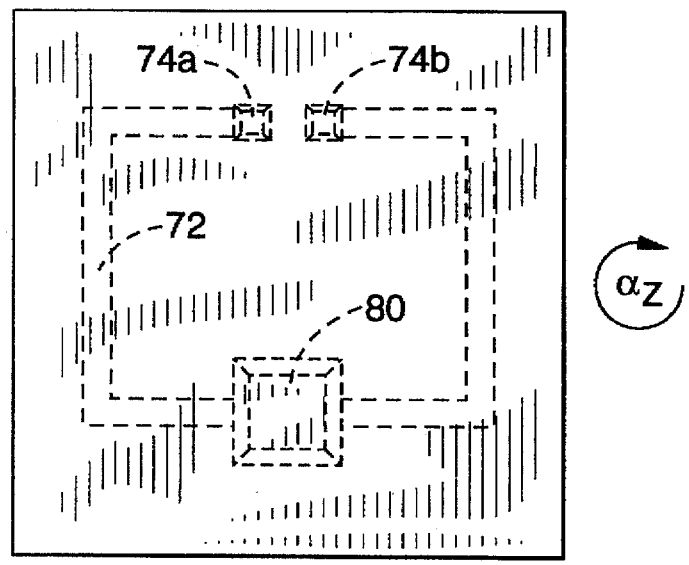
FIG. − 18

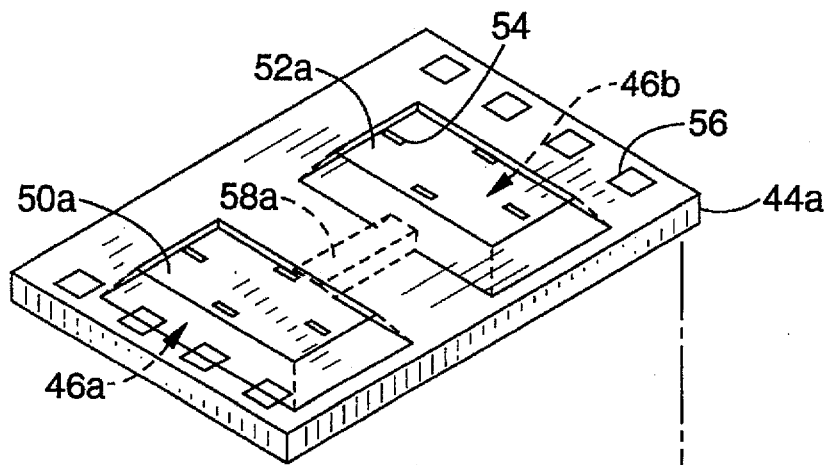
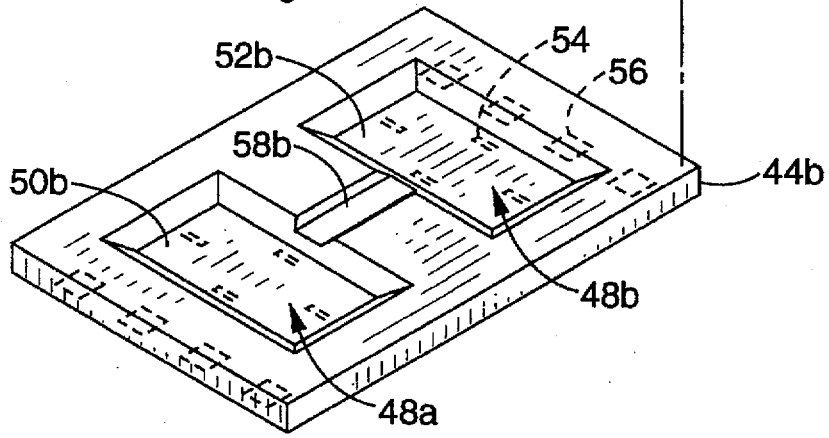
FIG. – 6
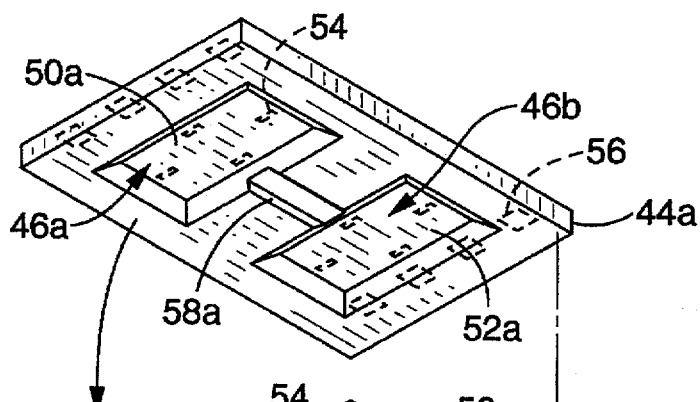
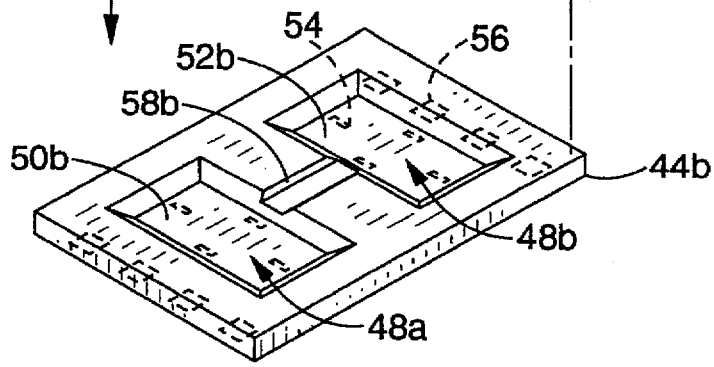
FIG. – 7

MICROMACHINED ACCELEROMETER

CROSS-REFERENCE TO RELATED APPLICATIONS

This application is a continuation of Ser. No. 08/193,487 filed on Feb. 7, 1994 now abandoned.

BACKGROUND OF THE INVENTION

1. Field of the Invention

This invention pertains generally to devices for measuring acceleration, and more particularly to a micromachined accelerometer employing a fluid proof mass.

2. Description of the Background Art

Conventional micromachined accelerometers employ a solid constrained proof mass. In such accelerometers, the proof mass typically comprises a section of silicon supported from a frame by thin silicon tethers or cantilevers. One class of such devices employs strain measurement in the constraining tethers or cantilevers to sense inertial forces on the proof mass. Strain measurement is typically achieved through the use of implanted or diffused piezoresistors in the constraints. This is the principle employed in piezoresistive cantilevered or tethered accelerometers. Another class of devices senses displacement of the constrained proof mass by capacitive transduction, and often employs force-feedback techniques to improve sensitivity. Additionally, conventional solid proof mass micromachined accelerometers provide only one axis of inertial sensitivity; that is, only one degree of freedom. While monolithic devices having two degrees of freedom have been considered, none have achieved commercial viability.

While macroscopic sensors have been built with fluid proof mass as an assembly of components such as pressure sensors and rigid tubing filled with fluid, micro-fabricated accelerometers employing a fluid proof mass have not been heretofore developed. Additionally, there are no known monolithic or micromachined accelerometers with three linear degrees of freedom. Nor have monolithic or micromachined accelerometers with combined linear and rotational acceleration sensitivity been heretofore developed. Therefore, there is a need for a sensitive micromachined accelerometer having multiple linear degrees of freedom and which can be used to measure linear and rotational acceleration. The present invention satisfies those needs, as well as others, and overcomes the deficiencies in devices heretofore developed.

SUMMARY OF THE INVENTION

The present invention generally pertains to a hydrostatic micro-fabricated accelerometer which employs a fluid proof mass. By way of example, and not of limitation, the invention comprises a laminate of bonded substrate layers having a plurality of micromachined fluid cavities joined by micromachined channels. In a typical embodiment, the cavities extend from the bonded inner surfaces of the substrate layers to points near the outer surfaces of the substrate layers. In this manner, each substrate layer is thinned toward its outer surface thereby forming a resilient membrane. In another embodiment, the cavities extend entirely through base substrate layers and thin substrate layers are bonded to the base substrate layers to form a resilient membrane over the cavities. For each embodiment, piezoresistors are deposited on or bonded to the membranes thereby creating piezoresistive diaphragm pressure sensors. The piezoresistors are joined to contact pads via thin film metal deposition or the like. The cavities and connecting channel are then filled with a fluid and sealed.

When the invention is subjected to accelerating motion, force will be exerted on the fluid contained within the cavities. Depending upon the particular direction of acceleration, the cavities will deform either inward or outward. The piezoresistive pressure sensors can then be used to sense the direction and amount of change in pressure on the diaphragms for measurement of acceleration.

By employing a plurality of such cavities and concomitant pressure sensing diaphragms, it is possible to measure acceleration in all three translational acceleration axis as well as all three rotational axes using a single micromachined package. As a result, the device can be used for inertial navigation or guidance in military, automotive and commercial applications, at a significant savings in cost as compared to current multi-axis solid proof mass implementations. Further, the device can be implemented in other applications requiring multi-axis inertial sensors such as virtual reality human/machine interfaces, consumer electronic guidance systems, all of which could require at least three and possible six axes of response.

An object of the invention is to provide an inertial sensor employing a liquid proof mass.

Another object of the invention is to provide a micro-fabricated hydrostatic accelerometer.

Another object of the invention is to provide a micro-fabricated accelerometer with multi-axis resolution.

Another object of the invention is to fabricate a multi-axis accelerometer using substrate materials such as semiconductors and insulators.

Anther object of the invention is to provide for laminated micro-fabrication of a hydrostatic accelerometer.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is a cross-sectional view of a lateral-axis accelerometer in accordance with the present invention.

FIG. 5 is a cross-sectional view of a vertical-axis accelerometer in accordance with the present invention.

FIG. 6 is an exploded view of a two cavity accelerometer in accordance with the present invention for sensing acceleration in two translation axes and one rotational axis, showing the outer surface of the upper layer and the inner surface and cavities of the lower layer.

FIG. 7 is an exploded view of the accelerometer shown in FIG. 6, showing the inner surface and cavities of the upper layer and the inner surface and cavities of the lower layer.

FIG. 18 is a plan view of a two membrane diaphragm accelerometer in accordance with the present invention for sensing acceleration about the z-axis in the apparatus shown in FIG. 17.

DESCRIPTION OF THE PREFERRED EMBODIMENTS

Referring more specifically to the drawings, for illustrative purposes the present invention is embodied in the apparatus shown therein. It will be appreciated that the apparatus may vary as to configuration and as to details of the parts, as well as to the manner of fabrication, without departing from the basic concepts as disclosed herein.

Figure 1:
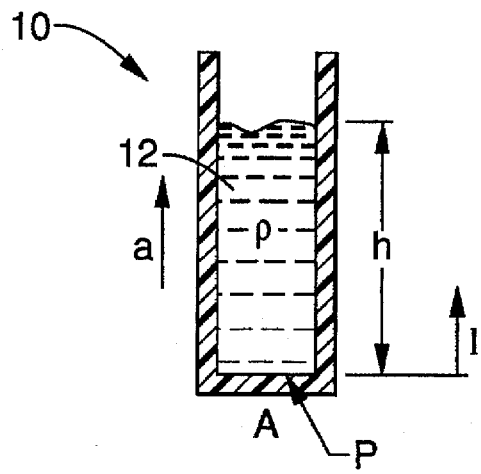
FIG. 1 diagrammatically shows in cross-section a column of fluid undergoing vertical acceleration.

Referring to FIG. 1, acceleration a causes inertial forces to act on a column 10 of fluid 12 having a column height h and fluid density p, resulting in a pressure P at surface A. Under 1 G acceleration, where g=9.8m/s², fluid head pressure P is:

$$P = g \int_0^h \rho l\, dl$$

Under arbitrary acceleration a, in meters per second squared, $$P = a \int_0^h \rho l\, dl = \rho h a$$

Figure 2:
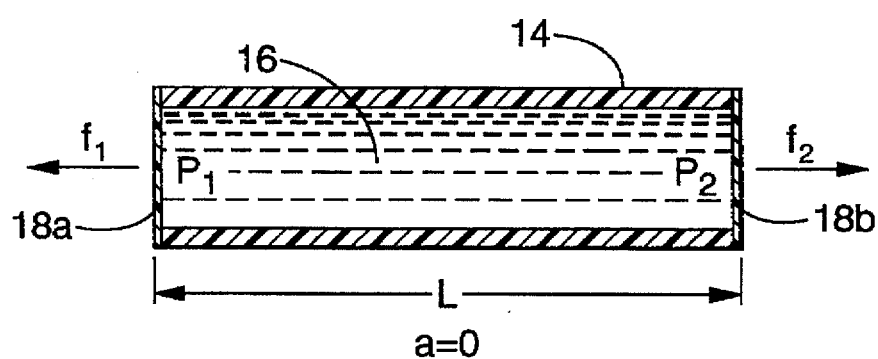
FIG. 2 diagrammatically shows in cross-section an assembly of tubing, fluid and diaphragms at each end.
Figure 3:
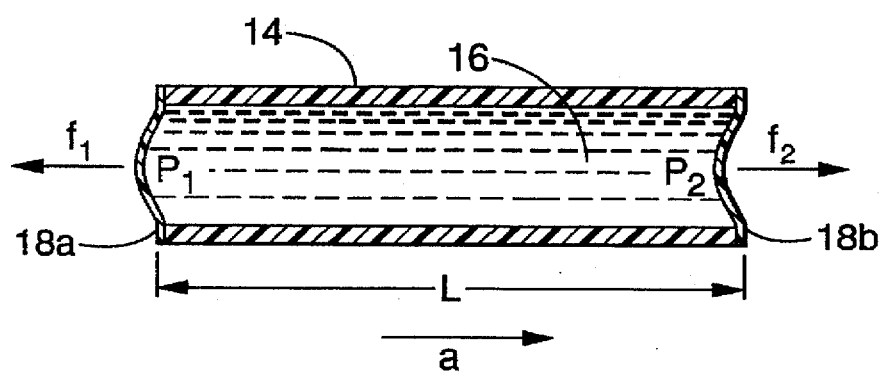
FIG. 3 diagrammatically shows the deflection of the diaphragms which results when the assembly of FIG. 2 undergoes acceleration.
Figure 8:
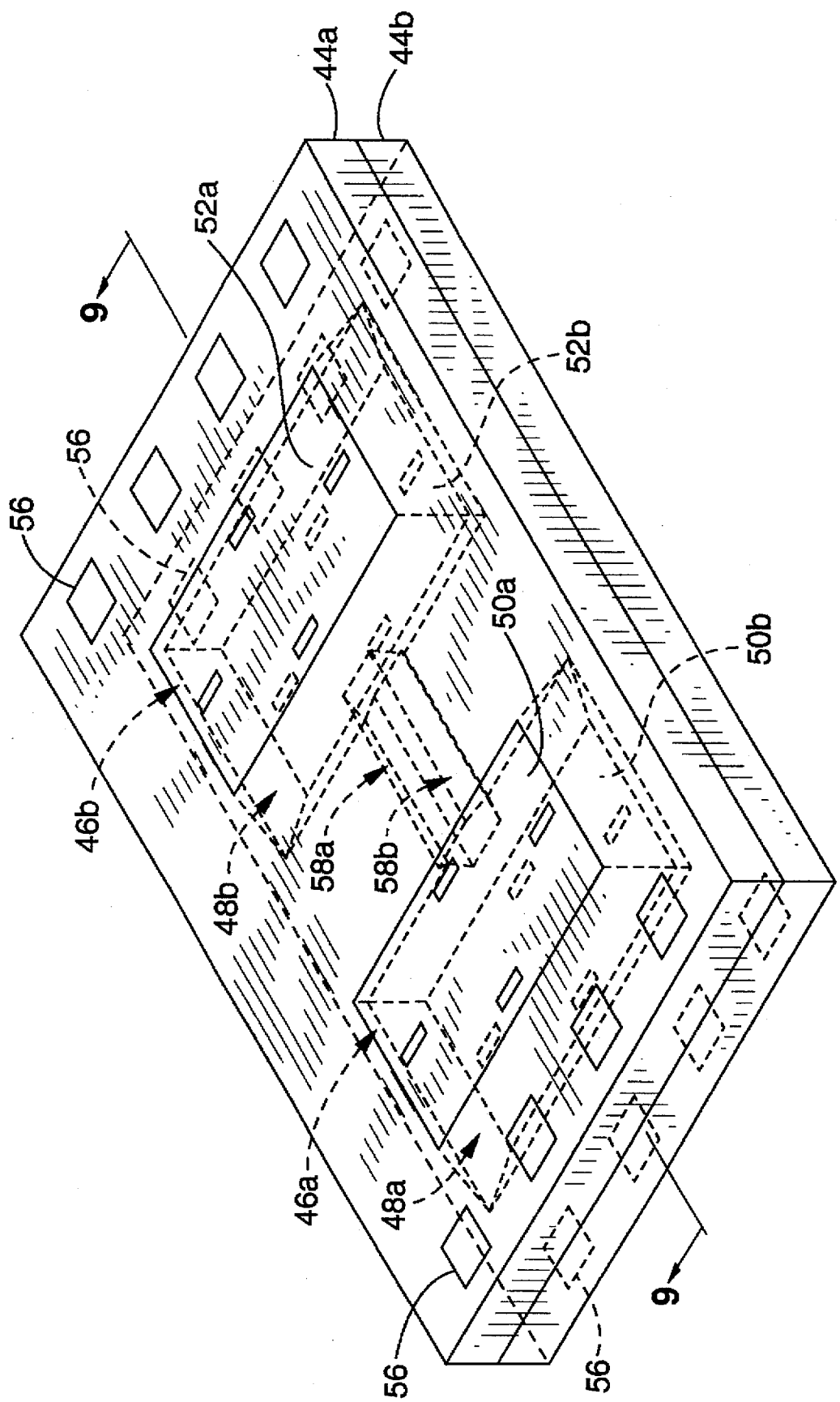
FIG. 8 is an assembled view of the accelerometer shown in FIG. 6 and FIG. 7.
Figure 9:
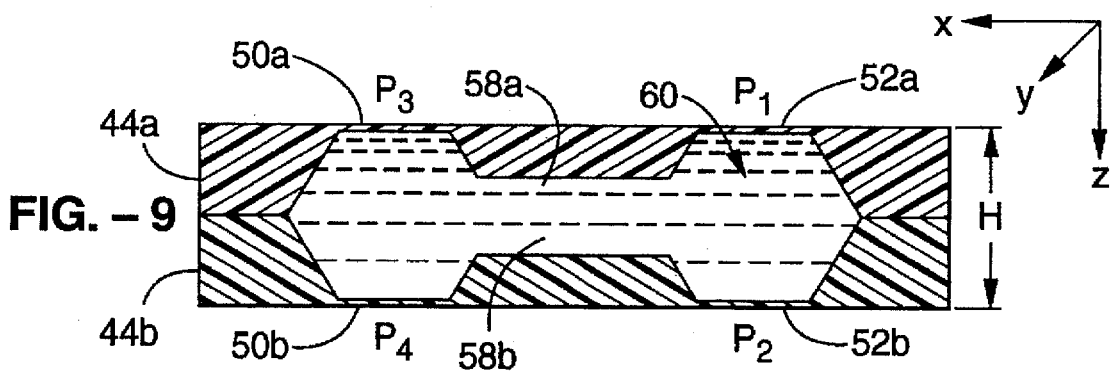
FIG. 9 is a cross-section of the assembly of the accelerometer shown in FIG. 8 taken through line 9—9, diagrammatically showing axial relationships and the position of the membrane diaphragms when the accelerometer is static.

Referring to FIG. 2, this principle of fluid head pressure can be used to transduce acceleration to pressure using membrane diaphragms as pressure transducers. In FIG. 2 and FIG. 3, a rigid tube 14 of length L is shown filled with an incompressible fluid 16 having a density p and capped at each end with identical compliant membrane diaphragms 18a, 18b. In both representations, f≡diaphragm pressure, which is the integral of the membrane deflecting forces over the membrane area; $f_1=-f_2$; P≡fluid pressure, $P_1$ is the fluid pressure at membrane diaphragm 18a, and $P_2$ is the fluid pressure at membrane diagram 18b. As can be seen from FIG. 1, where acceleration a=0, there is no deflection of either membrane diaphragm. However, where there is translational acceleration along the longitudinal axis of tube 14, the membrane diaphragms deflect in a direction which is opposite to the direction of acceleration. If the membrane diaphragms are identical in size and compliance and the structure is symmetrical $$P_1 = -P_2 \frac{1}{2} L\rho a$$

Because the membrane diaphragms are identical, the resultant pressure in the constrained fluid column is split between the membrane diaphragms equally and $$\frac{\partial P_1}{\partial a} = \frac{L\rho}{2}$$

As can be seen, therefore, in order to maximize sensitivity, L and p are maximized.

The present invention implements the foregoing principle of operation in a monolithic micromachined or microfabricated device. For example, FIG. 4 shows a basic lateral accelerometer configuration in cross-section for illustrative purposes. A substrate layer 20 is micromachined so as to form a plurality of fluid cavities 22a, 22b which are connected by a channel 24. As a result of the micromachining, the substrate is thinned in the area of the cavities so as to form resilient membrane diaphragms 26a, 26b between the fluid cavities and upper surface 28 of the substrate layer. The resulting structure is then bonded to a base substrate layer 30. The cavities and connecting channel are then filed with fluid 32 and sealed. When there is translational acceleration along the longitudinal axis of the cross-section as shown (horizontal x-axis), membrane diaphragm 26b will deflect or bulge outward toward surface 28 and membrane diaphragm 26a will deflect or bulge inward toward base substrate layer 30. Referring now to FIG. 5, a basic vertical accelerometer configuration is shown in cross-section for illustrative purposes. Here, upper and lower layers 34a, 34b are micromachined and bonded so as to form symmetrical fluid cavities 36a, 36b each of which is bounded by a membrane diaphragm 38a, 38b, respectively, and filled with a fluid 40. When there is translational acceleration along the vertical axis as shown (z-axis), membrane diaphragm 38a will deflect and bulge outward toward upper surface 42 and membrane diaphragm 38b will deflect and bulge inward toward upper surface 42. Hence, the relationship for FIG. 4 and FIG. 5 is similar to that discussed previously with reference to FIG. 2 and FIG. 3.

It can be seen, therefore, that the lateral and vertical structures of FIG. 4 and FIG. 5 can be combined to form devices with multiple axis sensitivity. For example, two of the devices shown in FIG. 4 can be formed perpendicular to each other on the same substrate, thus providing acceleration sensitivity in both orthogonal directions forming the substrate plane. The fluid channels may be separate, or may be formed in a square crossed pattern. By forming each of the cavities in the two-axis device in the configuration shown in FIG. 5, the resultant device will be sensitive to three orthogonal linear accelerations, two rotational accelerations, and one rotational rate in the substrate plane.

The resultant device is then combined with conventional membrane based pressure sensors. These pressure sensors can be, for example, square diaphragm bulk micromachined piezoresistive sensors or, alternatively, polysilicon surface micromachined capacity pressure sensors. The substrate layers can be bonded to each other by fusion bonding, adhesive bonding methods such as glass flit or eutectic bonding, or the like.

Acceleration signals are then taken from algebraic combinations of signals from each of the eight pressure sensing diaphragms. The acceleration signals formed in this manner are differential mode measurements, and second order effects such as, but not limited to, thermal stresses, and ambient pressure are absorbed in the common mode. Thermal expansion relief may be added to absorb thermal stresses caused by the expansion coefficient mismatch between the fluid and the substrates, in the form of a compliant membrane in the center of the device, which may be a thin silicon membrane, an elastomeric membrane covering a fluid-filling port, or any other compliant structure.

Referring now to FIG. 6 through FIG. 12, fabrication of a simple accelerometer in accordance with the present invention can be seen in more detail. The device shown therein, which comprises a lamination of a top substrate layer 44a and a symmetrical bottom substrate layer 44b, which are micromachined so as to form two fluid cavities in each layer. Top substrate layer 44a includes upper cavities 46a, 46b and bottom substrate layer 44b includes lower cavities 48a, 48b. The cavities are micromachined so as to thin the substrate to form membrane layers between the cavities and the surface of the substrate. In this way, resilient membrane diaphragms 50a, 52a are formed on top substrate layer 44a and membrane diaphragms 50b, 52b are formed in bottom substrate layer 44b. As can be seen, therefore, each layer is machined with two membrane diaphragms which are generally coplanar with the surface of the layer, for a total of four such membranes diaphragms in the bonded structure. Note also, that membrane diaphragms 50a, 52a are spaced apart and aligned laterally, as are membrane diaphragms 50b, 52b, and that membrane diaphragms 50a, 50b are vertically aligned as are membrane diaphragms 52a, 52b. The symmetry of the cavities and membrane diaphragms is necessary to maintain linearity of the device. A plurality of pressure sensors 54 are then deposited or otherwise formed on the outer surfaces of each membrane diaphragm. Each pressure sensor 54 is then connected to a metal film contact pad 56, or the like, which has been deposited on or etched into the outer surface of each substrate layer.

Cavities 46a, 46b in top substrate layer 44a are connected by a micromachined channel 58a, and cavities 52a, 52b in bottom substrate layer 44b are connected by a micromachined channel 58b. The cavities are filled with a high density incompressible fluid such as ethylene glycol or mercury, and sealed. Filling can be by means of small longitudinal central channels (not shown) between the ends of the device, through which the fluid can be drawn so as to expel air, with the ends of the channel being sealed after filling. Top and bottom substrate layers 44a, 44b can be formed from silicon, gallium arsenide or a variety of other materials which can be micromachined using conventional techniques and which can be thinned so as to form resilient membranes.

Figure 10:
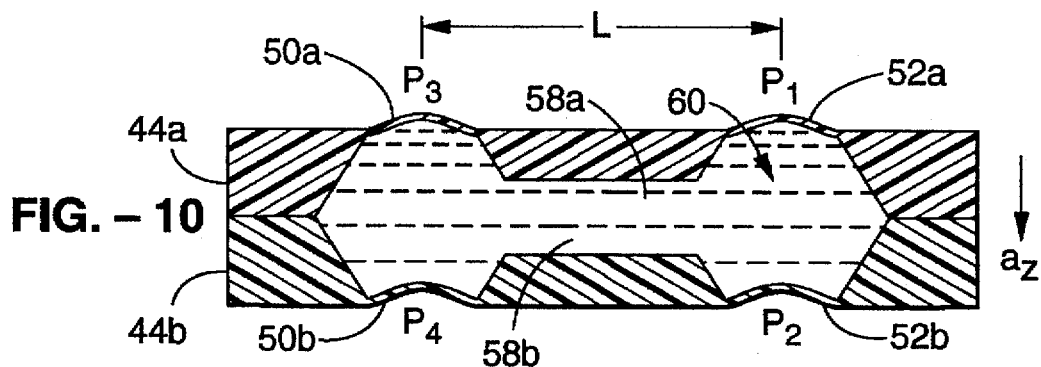
FIG. 10 is a diagrammatic view in cross-section showing the deflection of the membrane diaphragm of the accelerometer of FIG. 8 during translational acceleration in the z-direction.
Figure 11:
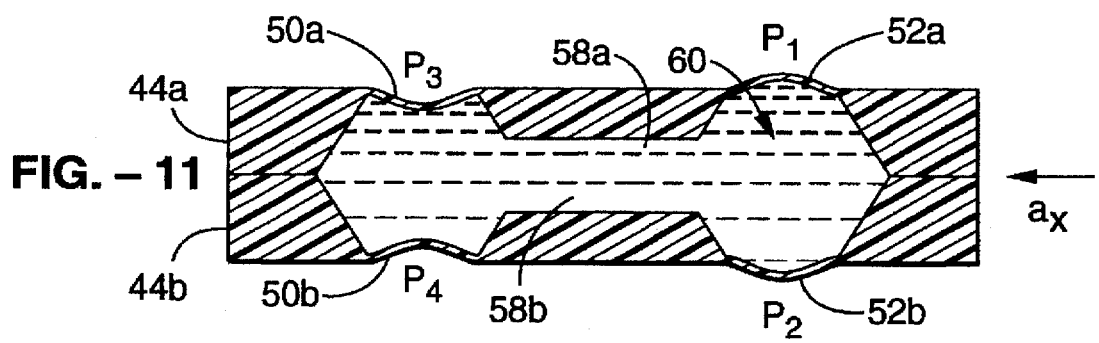
FIG. 11 is a diagrammatic view in cross-section showing the deflection of the membrane diaphragm of the accelerometer of FIG. 8 during translational acceleration in the x-direction.
Figure 12:
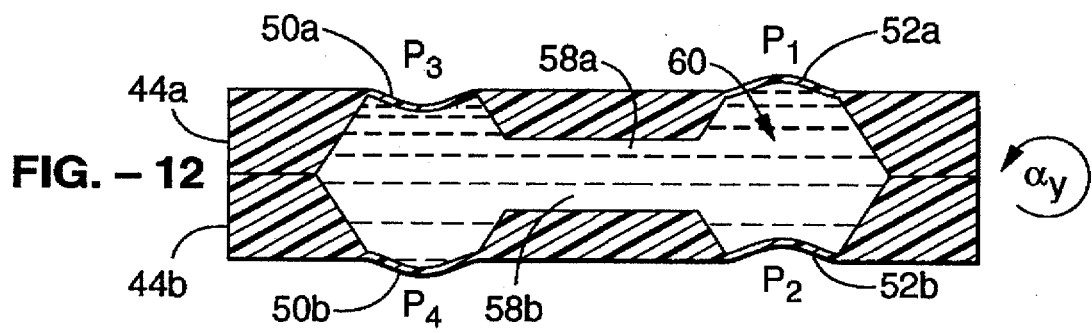
FIG. 12 is a diagrammatic view in cross-section showing the deflection of the membrane diaphragm of the accelerometer of FIG. 8 during rotational acceleration about the y-axis.
Figure 13:
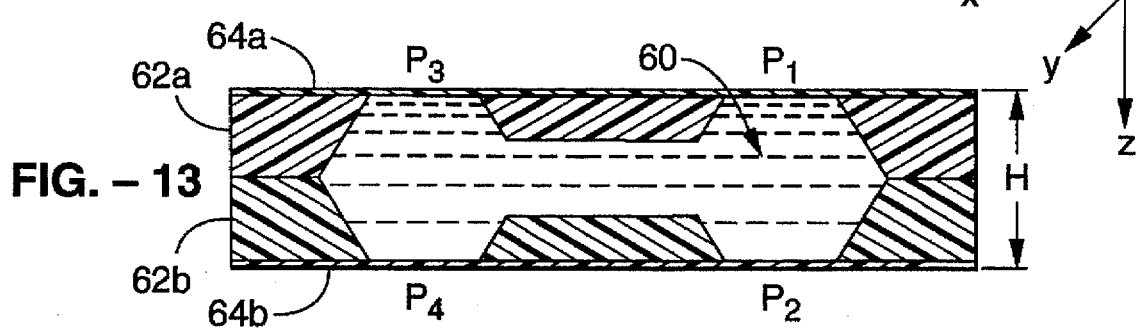
FIG. 13 through FIG. 16 are cross-sectional views of an alternative embodiment of the accelerometer shown in FIG. 9 through FIG. 12, respectively.
Figure 14:
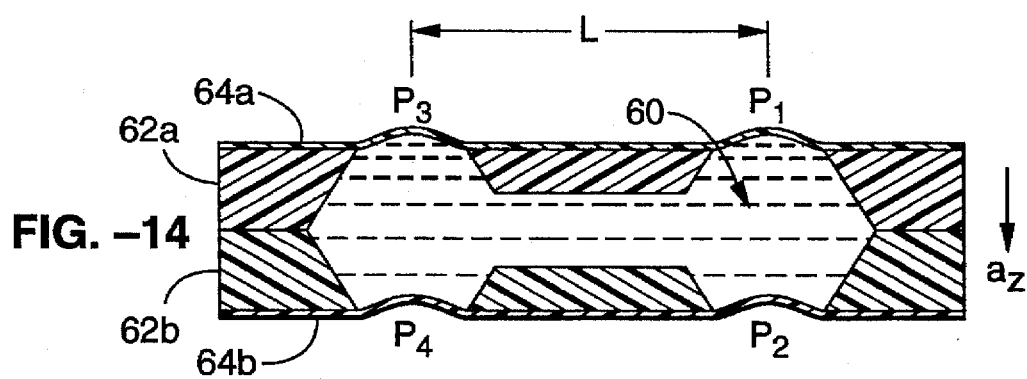
Figure 15:
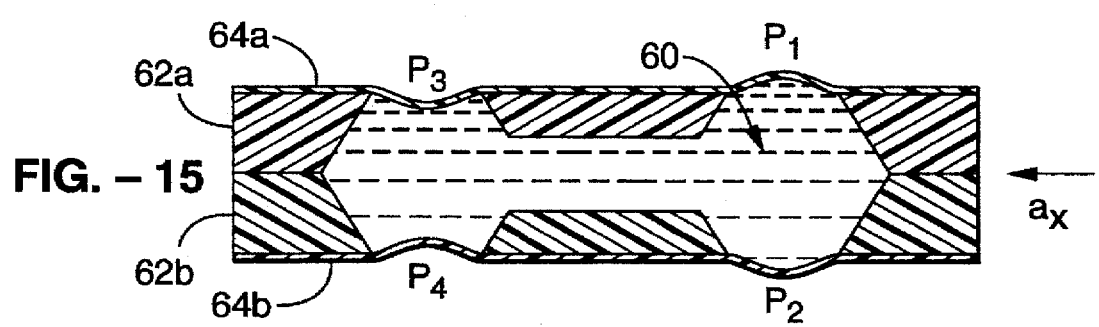
Figure 16:
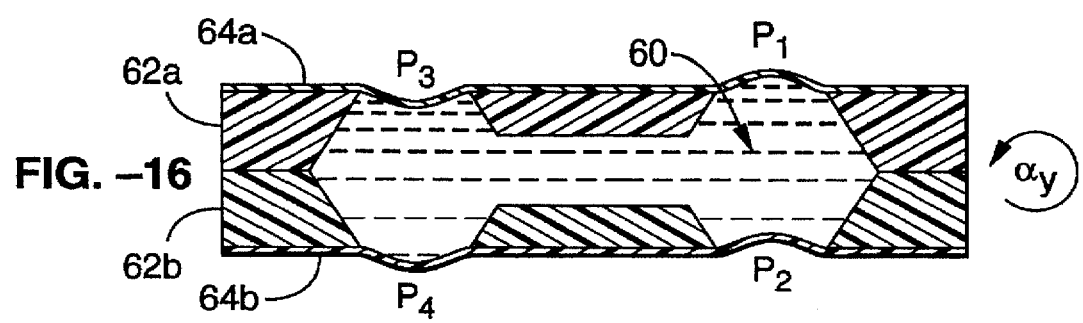

Referring now to FIG. 9 through FIG. 12 more particularly, the cavities are filled with an incompressible fluid 60. Using the axial representation shown in the static diagram of FIG. 9, FIG. 10 through FIG. 12 illustrate in cross-section the deformation of the membrane diaphragms in response to various inertial forces. The structures have a center-to-center distance L in the x-direction between the membrane diaphragms, while the separation between the membrane diaphragms H in the z-direction is approximately the sum of the thicknesses of the substrate layers. FIG. 10 shows the sensitivity to acceleration $a_z$ along the z-axis, FIG. 11 shows the sensitivity to acceleration $a_x$ along the x-axis, and FIG. 12 shows the sensitivity to rotation $\alpha_y$ about the y-axis.

The measured pressures $P_1$, $P_2$, $P_3$ and $P_4$ are taken at membrane diaphragms 52a, 52b, 50a, 50b, respectively. Pressure may be transduced to a voltage, current, or other signal depending upon the specific pressure sensor technology used. The acceleration quantities are derived from the algebraic relations of the four measured pressures P1 through P4 according to:

$$a_x = \tfrac{1}{2} k_x (P_1 + P_2 - P_3 - P_4)$$

$$a_z = \tfrac{1}{2} k_z (P_1 + P_3 - P_2 - P_4)$$

$$a_y = \phi$$

$$\alpha_x = \alpha_z = \phi$$

$$\alpha_y = \tfrac{1}{2} k_z (P_2 + P_3 - P_1 - P_4)$$

$$k_x = L\rho$$

$$k_z = H\rho$$

Positive pressure is taken as that which deflects a given membrane diaphragm outward and negative pressure is taken as that which deflects a given membrane diaphragm inward. The linear accelerations are denoted by lower case a with subscripts for direction. The rotational accelerations are denoted by the symbol $\alpha$ also with appropriate subscripts. Note that all acceleration outputs are uncoupled if the individual pressure sensors are identical in response and membrane compliance. The implication is that the outputs are independent, or that the response to orthogonal accelerations is uncoupled.

Referring to FIG. 13 through FIG. 16, it can be seen that, instead of thinning the substrate layers 44a, 44b through micromachining to form resilient membranes between the cavities and the surfaces of the substrate layers, the cavities could be micromachined entirely through the substrate layers. In such a configuration, it is possible to use rigid materials such as glass or other insulators for the substrate layers and form the membranes as separate layers bonded to the substrate layers. In these figures, substrate layers 62a, 62b are shown bonded to thin layers 64a, 64b which form membranes over the cavities. Otherwise, the device is fabricated in the same manner as described with regard to FIG. 6 through FIG. 8. Acceleration measurements and descriptions of deformation of membranes in FIG. 13 through FIG.

16 correspond to those described with respect to FIG. 9 through FIG. 12, respectively.

Figure 17:
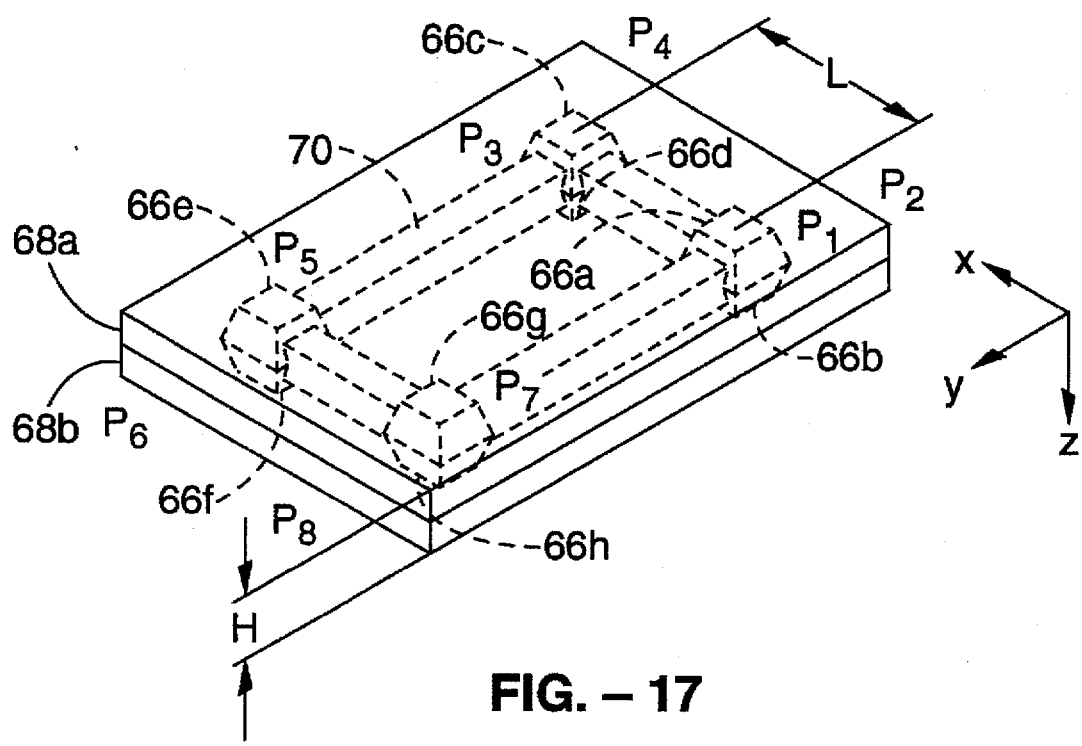
FIG. 17 is a perspective view of an eight membrane diaphragm accelerometer in accordance with the present invention for sensing acceleration in three translational axes and two rotational axes.

Referring now to FIG. 17, a full implementation of a symmetrical micromachined hydrostatic accelerometer in accordance with the present invention is diagrammatically shown. This embodiment, which expands upon the simple accelerometer previously described, includes eight identical pressure sensing membrane diaphragms 66a, 66b, 66c, 66d, 66e, 66f, 66g, 66h, in two substrate layers 68a, 68b to sense all three translational and two rotational accelerations. As can be seen, the pressure sensing membrane diaphragms are arranged in a square pattern where the fluid channels 70 do not cross. The pressures at the foregoing membranes, $P_1$, $P_2$, $P_3$, $P_4$, $P_5$, $P_6$, $P_7$, $P_8$, respectively, are measured and used to determine the acceleration outputs according to:

$$a_x = \tfrac{1}{4} sk_{x,y}[(P_1+P_2+P_7+P_8)-(P_3+P_4+P_5+P_6)]$$

$$a_y = \tfrac{1}{4} sk_{x,y}[(P_1+P_2+P_3+P_4)-(P_5+P_6+P_7+P_8)]$$

$$a_z = \tfrac{1}{4} sk_z[(P_1+P_3+P_5+P_7)-(P_2+P_4+P_6+P_8)]$$

$$\alpha_x = \tfrac{1}{4} sk_z[(P_1+P_3+P_6+P_8)-(P_2+P_4+P_5+P_7)]$$

$$\alpha_y = \tfrac{1}{4} sk_z[(P_3+P_5+P_2+P_8)-(P_1+P_7+P_4+P_6)]$$

$$\alpha_z = \phi$$

$$k_{x,y} = L\rho$$

$$k_z = H\rho$$

where s=the sensitivity of the sensor to pressure. Note that all accelerations except for rotation about the z-axis are represented by orthogonal equations. To sense rotation about the z-axis, or $\alpha_z$, the structure diagrammatically shown in FIG. 18 can be separately formed on the same device. The structure shown in FIG. 18 comprises a split loop channel 70 with sensing membranes 72a, 72b positioned at each end of the channel, respectively.

Note also, that the accelerometer has zero signal crossover between the acceleration channels formed. For example, the translational acceleration in the x-direction does not affect the rotational x-output. As indicated before, rotational acceleration about the x-axis, $\alpha_x$, is determined according to:

$$\alpha_x = \tfrac{1}{4} sk_z[(P_1+P_3+P_6+P_8)-(P_2+P_4+P_5+P_7)]$$

Translational acceleration in the x-direction causes a positive and equal signal e in $P_1$, $P_2$, $P_7$ and $P_8$, and a negative and equal signal in $P_3$, $P_4$, $P_5$ and $P_6$. Adding and subtracting e appropriately to the pressure signals in $\alpha_x$ gives the combined output, $$\alpha_{x(+a_x)} = \tfrac{1}{4} sk_z[(P_1+e+P_3-e+P_6-e+P_8+e) - (P_2+e+P_4-e+P_5-e+P_7+e)]$$

which is equivalent to $$\alpha_{x(+a_x)} = \tfrac{1}{4} sk_z[(P_1+P_3+P_6+P_8) - (P_2+P_4+P_5+P_7)]$$

which is equivalent to $$\alpha_x$$

The same holds for all of the other combinations of signals.

Note also, that thermal mismatch between the fluid used as a proof mass and the silicon substrate material can pose a significant problem. For example, a typical volummetric thermal expansion coefficient, C, for a fluid is $1.82\times10^{-4}$ whereas that of silicon is $2.76\times10^{-5}$. Over an operating temperature range of $-20°$ C. to $85°$ C., a volummetric fluid expansion of 0.04 micro-liters occurs over that of silicon. This will cause a center deflection of approximately 15 microns for a device having eight 700 micron edge dimension pressure sensing membrane diaphragms and a total fluid volume of 2.2 microliters at $22°$ C. Center deflection (or equivalently pressure) caused by thermal mismatch is common mode to all eight pressure sensor outputs and does not appear in the ideal calculated inertial outputs. The structural stress causes by thermal effects may, however, affect pressure sensor linearity, or compromise the physical integrity of the accelerometer structure.

Figure 19:
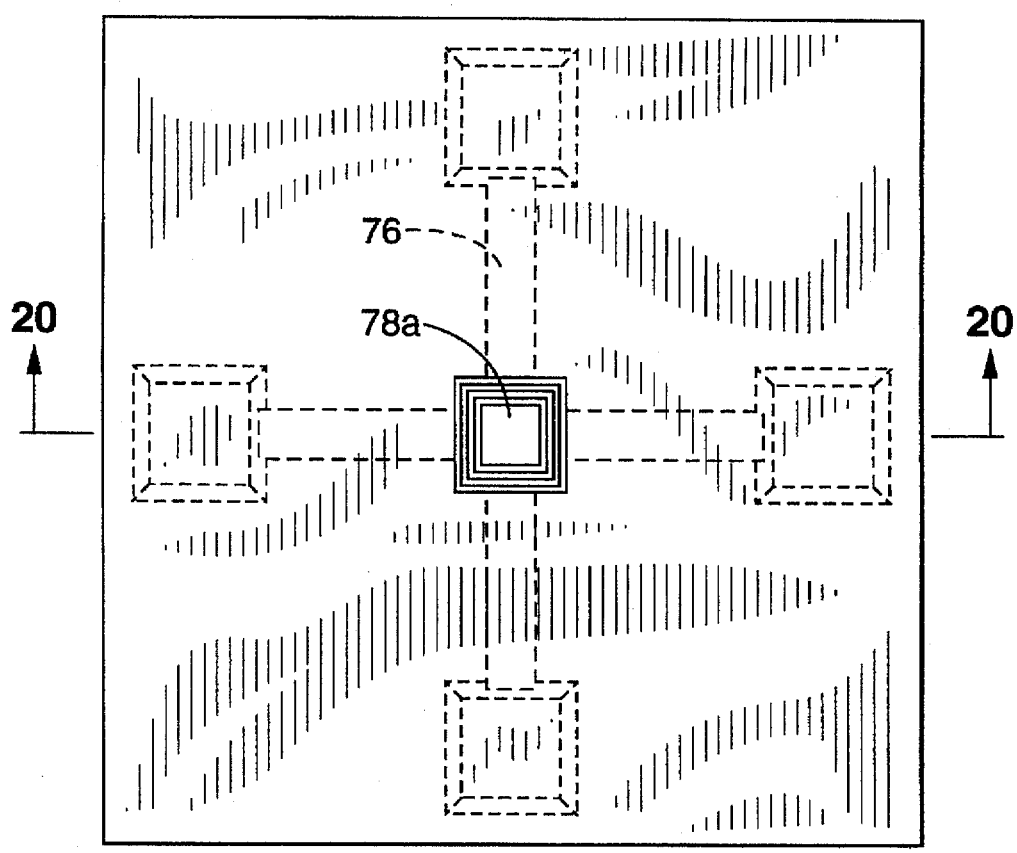
FIG. 19 is a plan view of an alternative embodiment of an eight membrane diaphragm accelerometer in accordance with the present invention for sensing acceleration in three translational axes and two rotational axes, showing a cross-channel configuration and a pressure absorbing membrane.
Figure 20:
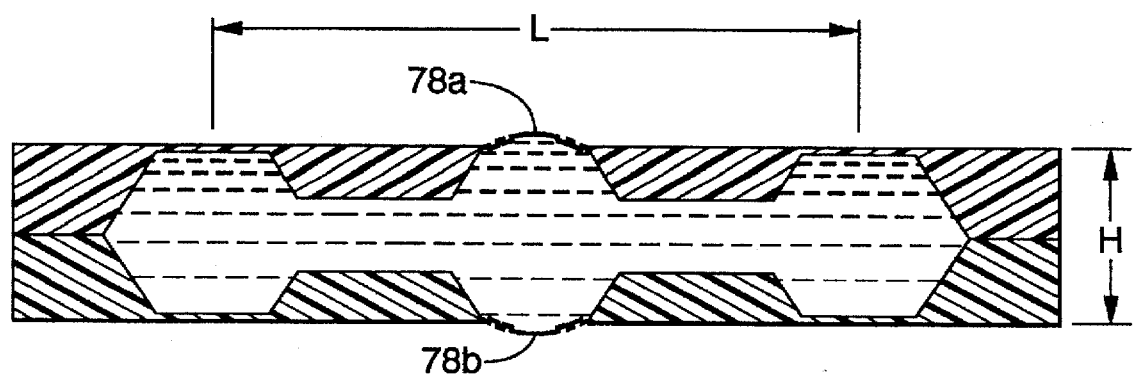
FIG. 20 is a diagrammatic cross-section view of the accelerometer shown in FIG. 19 taken through line 20—20 showing the pressure absorbing membrane under thermal stress.

Referring to FIG. 19, which is a plan view of an alternative embodiment of the accelerometer shown in FIG. 17 wherein the channels 76 are arranged in a "cross" configuration, very compliant pressure absorbing membranes 78a, 78b have been added at the center of each layer in the structure in order to overcome the problem of thermal mismatch and expansion. The effect of the compliant membrane is to reduce L by one-half, and reduce the sensitivity of each pressure sensor's output to temperature. As can be seen in FIG. 20, the pressure absorbing membranes 78a, 78b will expand and bulge outward to relieve thermal stress. Referring again to FIG. 18, a similar pressure absorbing membrane 80 can be positioned at the midpoint of the open loop formed by channel 70.

Note that the compliant central pressure absorbing membranes can cause an additional sensitivity to the rotational velocity $\omega_z$ about the z-axis. This rotational velocity creates a common mode pressure on all eight of the pressure sensing membrane diaphragms. This velocity signal, which is determined according to $$\omega_z \propto \tfrac{1}{8} sk_{x,y} \sum_{i=1}^{8} P_i$$

where i=an index representing a particular pressure sensing membrane diaphragm, is due to the centrifugal forces generated during z-axis rotation which are transferred to the pressure sensing membrane diaphragms only in the presence of the central pressure absorbing membrane.

In order to improve the acceleration sensitivity of the sensor, it is desirable to use a high density fluid as the proof mass. Such fluids include water, mercury, high molar HCL, silicon gels, and the like. Since them are practical concerns with each fluid chosen, such as material compatibility, ability to fill and seal the fluid cavity, and thermal mismatch between the fluid and the substrate material, the choice of fluid is based on a consideration of the practical tradeoffs in implementation.

The physical dimensions L and H also affect device sensitivity to acceleration, which sensitivity increases linearly with these parameters. There is, however, a practical consideration which affects the flexibility to vary L and H. For example, standard silicon wafers which may be used in a monolithic silicon device are approximately 0.5 millimeters in thickness. Therefore, a two layer structure used in an accelerometer according to the present invention would have an H=1 millimeter where silicon is used. In order to maintain symmetry in the acceleration sensitivity to each axis, it would then be desirable to set L=H=1 millimeter. Further, the physical dimension of each pressure sensing membrane diaphragm must be considered. If the membrane edge dimension is comparable to L, then a significant pressure gradient will be present across the membrane during acceleration, leading to non-linearity of the acceleration response. Therefore, it is preferable for the membrane edge dimension, m, to be much smaller than L. A ratio of L/m=10 is sufficient for linearity in most designs, and implies a membrane edge dimension of 100 microns or less. Membrane thickness is on the order of approximately 10 microns.

Fluid filling of the cavity is not a practical difficulty. A fill channel can be included and fluid drawn between one end of the fluid channel and the other, thereby expelling air as the fluid channel and cavities are filled. A compatible sealant, such as silicone RTV rubber, can be employed where a water based fluid is used. Other types of sealants would be used, as appropriate, with other fluids.

Figure 21:
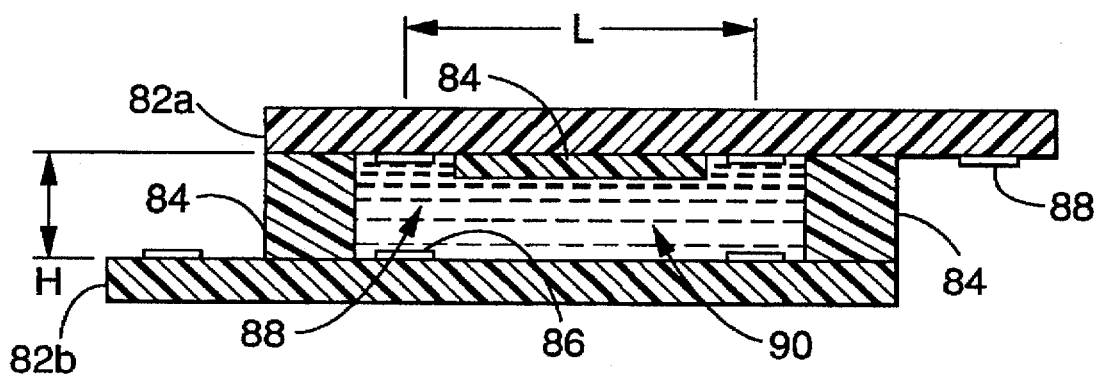
FIG. 21 is a cross-sectional view of a three layer accelerometer in accordance with the present invention using surface micromachined pressure sensors.

Referring now to FIG. 21, the foregoing accelerometer design can be implemented using surface micromachined pressure sensors instead of bulk micromachined piezoresistive devices. Such a device, which is shown in the cross-section of FIG. 21, includes upper and lower substrate layers 82a, 82b and an intermediate layer 84, and a plurality of surface micromachined pressure sensing elements 86 which are coupled to corresponding metal contact pads. Intermediate layer 84, which forms the fluid cavity 88, can be bulk micromachined silicon, glass, quartz or the like. The advantage of using surface micromachined devices is the small pressure sensor membrane diaphragm edge dimension, m, which is afforded by this technology. In this case, the dimension H and, therefore, L, can be increased well beyond 1 millimeter, with the resulting increase in sensitivity. However, the three-layer structure is more complex and is susceptible to drift and manufacturing difficulties with regard to the surface micromachined pressure sensing elements. Design of the pressure sensing elements themselves depends on the fluid 90 selected, H and L, and the desired acceleration range and resolution. In the case of piezoresistive technology, mercury as the fluid selected, H=1 millimeter and L=2 millimeter, and an acceleration range of ±20 g in all three translational axes, a 800 micron square, 8 micron thick silicon membrane pressure sensor could be fabricated.

Accordingly, it will be seen that the present invention provides a micro-miniature fluid proof mass accelerometer which can sense all three translational axes and two rotational axes in a two-layer micromachined device. All three rotational axes can be sensed by adding a separate sensor in the same micromachined package. The invention includes at least one sealed fluid cavity which is contained within a generally planar substrate structure. The fluid cavity extends from surface to surface of the substrate structure and is bounded by a resilient membrane diaphragm positioned between the cavity and the outer surface of the substrate structure. Pressure sensors, such as piezoresistors or the like, coupled to the membrane diaphragm sense pressure on the membrane diaphragm exerted by the fluid when the fluid undergoes acceleration. By including paired fluid cavities which are symmetrical in shape and joined by an interconnecting channel, translational and rotational acceleration can be sensed.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A multi-axis hydrostatic accelerometer, comprising:
   (a) a substrate having first and second substantially planar outer surfaces;
   (b) first, second, third, and fourth spaced-apart fluid coupled cavities positioned within said substrate between said first and second outer surfaces;
   (c) first, second, third, fourth, fifth, sixth, seventh and eighth resilient membranes integrally formed in said substrate, said first, second, third and fourth membranes respectively positioned between said first, second, third and fourth cavities and said first outer surface of said substrate, said third, fourth, fifth and sixth membranes respectively positioned between said first, second, third and fourth cavities and said second outer surface of said substrate; and
   (d) first, second, third, fourth, fifth, sixth, seventh and eighth pressure sensing means for respectively sensing pressure exerted on said first, second, third, fourth, fifth, sixth, seventh and eighth membranes by displacement of a fluid sealed within said cavities during acceleration of said substrate;
   (e) wherein said membranes are deflected due to pressure exerted on said membranes by displacement of said fluid during axial acceleration of said substrate, said axial acceleration including translational acceleration and rotational acceleration;
   (f) wherein said pressure sensing means provide electronic output signals for determining acceleration along at least three independent translational axes and at least two rotational axes.

2. A multi-axis hydrostatic accelerometer as recited in claim 1, wherein acceleration is determined according to $$a_x = \tfrac{1}{4}sk_{x,y}[(P_1+P_2+P_7+P_8)-(P_3+P_4+P_5+P_6)]$$

$$a_y = \tfrac{1}{4}sk_{x,y}[(P_1+P_2+P_3+P_4)-(P_5+P_6+P_7+P_8)]$$

$$a_z = \tfrac{1}{4}sk_z[(P_1+P_3+P_5+P_7)-(P_2+P_4+P_6+P_8)]$$

$$\alpha_x = \tfrac{1}{4}sk_z[(P_1+P_3+P_6+P_8)-(P_2+P_4+P_5+P_7)]$$

$$\alpha_y = \tfrac{1}{4}sk_z[(P_3+P_5+P_2+P_8)-(P_1+P_7+P_4+P_6)]$$

$$k_{x,y} = L\rho$$

$$k_z = H\rho$$

where a represents translational acceleration along a denoted axis, $\alpha$ represents rotational acceleration around a denoted axis, $P_1$, $P_2$, $P_3$, $P_4$, $P_5$, $P_6$, $P_7$, $P_8$, are pressure output signals from the respective pressure sensing means, s is the sensitivity of the pressure sensing means, $\rho$ is the density of the fluid, L is the center-to-center distance between cavities, and H is the separation between the membranes bounding a cavity.

3. A multi-axis hydrostatic accelerometer as recited in claim 1, further comprising pressure relief means for absorbing thermal expansion of said fluid, said pressure relief means integrally formed in said substrate and coupled to said cavities by said fluid.

4. A multi-axis hydrostatic accelerometer, comprising:
   (a) a substrate having substantially planar first and second outer surfaces;
   (b) first, second, third, and fourth spaced-apart cavities positioned within said substrate between said first and second outer surfaces;
   (c) first, second, third, fourth, fifth, sixth, seventh and eighth resilient membranes integrally formed in said substrate, said first, second, third and fourth membranes respectively positioned between said first, second, third and fourth cavities and said first outer surface of said substrate, said third, fourth, fifth and sixth membranes respectively positioned between said first, second, third and fourth cavities and said second outer surface of said substrate; and (d) a first channel connecting said first and second cavities;

(e) a second channel connecting said third and fourth cavities;

(f) a fluid sealed within said channels and said cavities wherein said channels and said cavities are coupled by said fluid; and (g) first, second, third, fourth, fifth, sixth, seventh and eighth pressure sensing means for respectively sensing pressure exerted on said first, second, third, fourth, fifth, sixth, seventh and eighth membranes by displacement of said fluid during acceleration of said substrate;

(h) wherein said membranes are deflected due to pressure exerted on said membranes by displacement of said fluid during axial acceleration of said substrate, said axial acceleration including translational acceleration and rotational acceleration;

(I) wherein said pressure sensing means provide electronic output signals for determining acceleration along at least three independent translational axes and at least two rotational axes.

5. A multi-axis hydrostatic accelerometer as recited in claim 4, wherein acceleration is determined according to $a_x = \frac{1}{4} s k_{x,y} [(P_1 + P_2 + P_7 + P_8) - (P_3 + P_4 + P_5 + P_6)]$ $a_y = \frac{1}{4} s k_{x,y} [(P_1 + P_2 + P_3 + P_4) - (P_5 + P_6 + P_7 + P_8)]$ $a_z = \frac{1}{4} s k_z [(P_1 + P_3 + P_5 + P_7) - (P_2 + P_4 + P_6 + P_8)]$ $\alpha_x = \frac{1}{4} s k_z [(P_1 + P_3 + P_6 + P_8) - (P_2 + P_4 + P_5 + P_7)]$ $\alpha_y = \frac{1}{4} s k_z [(P_3 + P_5 + P_2 + P_8) - (P_1 + P_7 + P_4 + P_6)]$ $k_{x,y} = L \rho$ $k_z = H \rho$ where a represents translational acceleration along a denoted axis, $\alpha$ represents rotational acceleration around a denoted axis, $P_1, P_2, P_3, P_4, P_5, P_6, P_7, P_8$, are pressure output signals from the respective pressure sensing means, s is the sensitivity of the pressure sensing means, $\rho$ is the density of the fluid, L is the center-to-center distance between cavities, and H is the separation between the membranes bounding a cavity.

6. A multi-axis hydrostatic accelerometer as recited in claim 4, further comprising pressure relief means for absorbing thermal expansion of said fluid, said pressure relief means integrally formed in said substrate and coupled to said cavities and said channels by said fluid.

7. A multi-axis hydrostatic accelerometer as recited in claim 4, further comprising:

(a) a third channel connecting said second and third cavities; and (b) a fourth channel connecting said first and fourth cavities.

8. A multi-axis hydrostatic accelerometer as recited in claim 4, wherein said first and second channels are elongated, wherein said first and second channels have midpoints at which said first and second channels intersect, and wherein said first channel is substantially perpendicular to said second channel.

9. A multi-axis hydrostatic accelerometer, comprising:

(a) a first substantially planar substrate layer;

(b) a second substantially planar substrate layer;

(c) said first and second substrate layers having opposing bonded inner surfaces, said first and second substrate layers having outer surfaces;

(d) first, second, third, and fourth spaced apart cavities extending from the bonded inner surface of the first substrate layer toward the outer surface of said first substrate layer;

(e) fifth, sixth, seventh, and eighth spaced apart cavities extending from the bonded inner surface of the second substrate layer toward the outer surface of said second substrate layer;

(f) first, second, third and fourth resilient membranes integrally formed in said first substrate layer, said first, second, third and fourth membranes respectively positioned between said first, second, third and fourth cavities and said outer surface of said first substrate layer;

(g) fifth, sixth, seventh and eighth resilient membranes integrally formed in said second substrate layer, said fifth, sixth, seventh and eighth membranes respectively positioned between said fifth, sixth, seventh and eighth cavities and said outer surface of said second substrate layer; and (h) a first channel connecting said first, second, fifth and sixth cavities;

(i) a second channel connecting said third, fourth, seventh and eighth cavities;

(j) a fluid sealed within said first channel and said first, second, fifth and sixth cavities wherein said first channel and said first, second, fifth and sixth cavities are coupled by said fluid;

(k) said fluid sealed within said second channel and said third, fourth, seventh and eighth cavities wherein said second channel and said third, fourth, seventh and eighth cavities are fluidly coupled; and (l) first, second, third, fourth, fifth, sixth, seventh and eighth pressure sensing means for respectively sensing pressure exerted on said first, second, third, fourth, fifth, sixth, seventh and eighth membranes by displacement of said fluid during acceleration;

(m) wherein said membranes are deflected due to pressure exerted on said membranes by displacement of said fluid during axial acceleration of said substrate, said axial acceleration including translational acceleration and rotational acceleration;

(n) wherein said pressure sensing means provide electronic output signals for determining acceleration along at least three independent translational axes and at least two rotational axes.

10. A multi-axis hydrostatic accelerometer as recited in claim 9, wherein acceleration is determined according to $a_x = \frac{1}{4} s k_{x,y} [(P_1 + P_2 + P_7 + P_8) - (P_3 + P_4 + P_5 + P_6)]$ $a_y = \frac{1}{4} s k_{x,y} [(P_1 + P_2 + P_3 + P_4) - (P_5 + P_6 + P_7 + P_8)]$ $a_z = \frac{1}{4} s k_z [(P_1 + P_3 + P_5 + P_7) - (P_2 + P_4 + P_6 + P_8)]$ $\alpha_x = \frac{1}{4} s k_z [(P_1 + P_3 + P_6 + P_8) - (P_2 + P_4 + P_5 + P_7)]$ $\alpha_y = \frac{1}{4} s k_z [(P_3 + P_5 + P_2 + P_8) - (P_1 + P_7 + P_4 + P_6)]$ $k_{x,y} = L \rho$ $$k_z = H\rho$$

where $a$ represents translational acceleration along a denoted axis, $\alpha$ represents rotational acceleration around a denoted axis, $P_1, P_2, P_3, P_4, P_5, P_6, P_7, P_8$, are pressure output signals from the respective pressure sensing means, $s$ is the sensitivity of the pressure sensing means, $\rho$ is the density of the fluid, L is the center-to-center distance between cavities, and H is the separation between the membranes bounding a cavity.

11. A multi-axis hydrostatic accelerometer as recited in claim 9, further comprising pressure relief means for absorbing thermal expansion of said fluid, said pressure relief means integrally formed in said substrate and coupled to said cavities and said channels by said fluid.

12. A multi-axis hydrostatic accelerometer as recited in claim 9, further comprising:

(a) a third channel connecting said second, third, sixth and seventh cavities; and (b) a fourth channel connecting said first, fourth, fifth and eighth cavities.

13. A multi-axis hydrostatic accelerometer as recited in claim 9, wherein said first and second channels are elongated, wherein said first and second channels have midpoints at which said first and second channels intersect, and wherein said first channel is substantially perpendicular to said second channel.

* * * * *